(12) United States Patent
Grenestedt (10) Patent No.: US 12,275,518 B2
(45) Date of Patent: Apr. 15, 2025

(54) COMPOSITE ATTACHMENT COUPLER AND COMPONENTS USING SAME

(71) Applicant: Joby Aero, Inc., Santa Cruz, CA (US)

(72) Inventor: Joachim L. Grenestedt, Hellertown, PA (US)

(73) Assignee: Joba Aero, Inc., Santa Cruz, CA (US)

( * ) Notice: Subject to any disclaimer, the term of this patent is extended or adjusted under 35 U.S.C. 154(b) by 150 days.

(21) Appl. No.: 17/994,266

(22) Filed: Nov. 25, 2022

(65) Prior Publication Data
US 2023/0271694 A1 Aug. 31, 2023

Related U.S. Application Data

(60) Provisional application No. 63/283,422, filed on Nov. 26, 2021.

(51) Int. Cl.
| | |
|---|---|
| *B64C 1/00* | (2006.01) |
| *B29C 70/46* | (2006.01) |
| *B29D 23/00* | (2006.01) |
| B29L 31/30 | (2006.01) |
| B64C 3/18 | (2006.01) |
| F16L 9/19 | (2006.01) |

(52) U.S. Cl.
CPC ............... *B64C 1/00* (2013.01); *B29C 70/46* (2013.01); *B29D 23/00* (2013.01); *B29L 2031/3085* (2013.01); *B64C 2001/0072* (2013.01); *B64C 3/18* (2013.01); *F16L 9/19* (2013.01)

(58) Field of Classification Search
CPC ..... B64C 1/00; B64C 3/18; B64C 2001/0072; B29C 70/46; B29D 23/00; B29L 2031/3085; F16L 9/19
See application file for complete search history.

(56) References Cited

U.S. PATENT DOCUMENTS

2020/0370212 A1* 11/2020 Gilbertson ........... D03D 25/005

\* cited by examiner

*Primary Examiner* — Daniel J Wiley
(74) *Attorney, Agent, or Firm* — Michael A. Guth (57) ABSTRACT

A joining structure adapted to join adjacent tube structures together while providing high strength with low weight. The joining structure may be of composite materials, and may include warp tows in the longitudinal direction of the tubes and have weft tows cross-woven into a fabric, which may be a carbon fiber. The joining structure may be Y-shaped and adapted to join three composite sheets together. The weft tows may also be wound around a central cluster of tows, or tows, which may provide extra strength. The tubes may be pressurized in use, such as in an aircraft fuselage.

9 Claims, 13 Drawing Sheets

COMPOSITE ATTACHMENT COUPLER AND COMPONENTS USING SAME

CROSS-REFERENCE TO RELATED APPLICATIONS

This application claims the benefit of U.S. Provisional Patent Application No. 63/283,422 to Grenestedt, filed Nov. 26, 2021, which is hereby incorporated by reference in its entirety.

FIELD OF THE INVENTION

This invention relates to composite materials, namely an attachment coupler used in structures such as aircraft fuselages.

BACKGROUND

A typical pressure vessel or aircraft fuselage has a circular cross section. A such a circular cylindrical tube can resist the loads associated with internal pressurization with tension stresses, rather than the more severe bending loads seen with non-circular cross sections. Connecting two or more pressure vessels, or fuselages, may have size advantages. For example, a "double bubble" (two cylindrical vessels connected) fuselage allows for a flattened fuselage and cabin shape without large increases in bending stresses. The double bubble fuselage is formed of intersecting circles.

A double bubble fuselage may take the shape of two adjacent bubbles coupled together by a shared central portion. A difficulty in design and construction of such a configuration is the joining structure where the three way joint between the adjacent bubbles and the central portion.

What is needed is a type of joint and construction that can withstand the loads at the three way joint area, or a multi-way joint area, with increased strength and decreased weight, while reducing the potential for delaminations of the composite structures used in these designs.

SUMMARY

A joining structure adapted to join adjacent tube structures together while providing high strength with low weight. The joining coupler may be of composite materials, and may include warp tows in the longitudinal direction of the tubes and have weft tows cross-woven into a fabric, which may be of carbon fiber. The joining coupler may be Y-shaped and adapted to join three composite areas together. The weft tows may also be wound around a central cluster of tows, which may provide extra strength. The tubes may be pressurized in use, such as in an aircraft fuselage.

DETAILED DESCRIPTION

Figure 1:
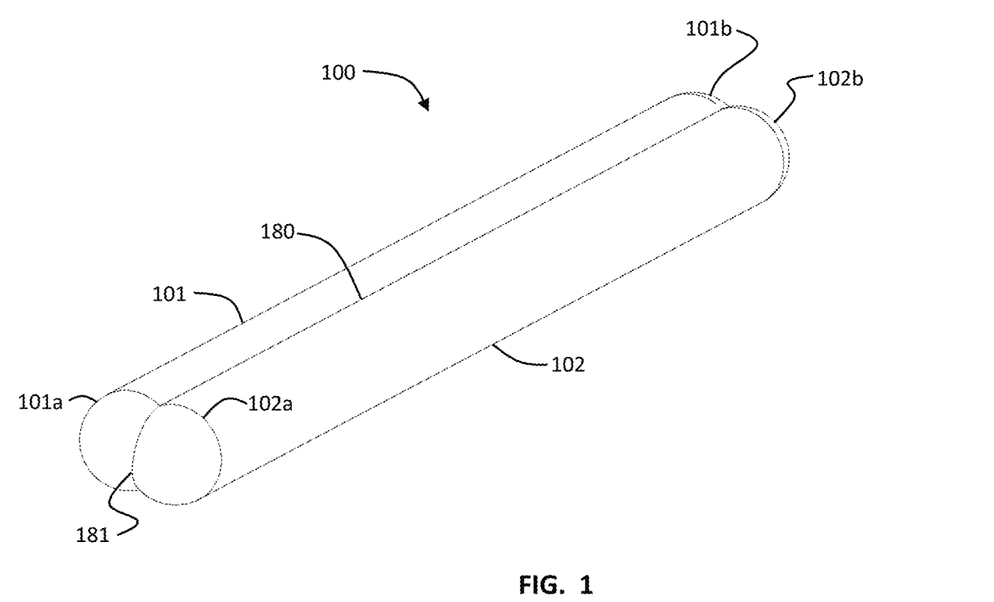
FIG. 1 is an illustration of a dual tube structure according to some embodiments of the present invention.
Figure 2:
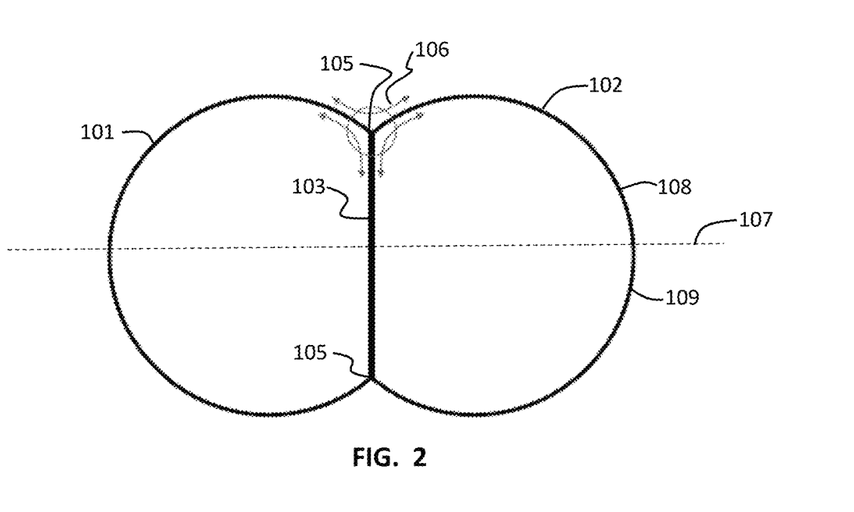
FIG. 2 is a cross-sectional view of a dual tube structure with center panel and panel attachment couplers according to some embodiments of the present invention.

In some embodiments of the present invention, as seen in FIG. 1, a dual tube structure 100 has a first tube section 101 and a second tube section 102. The first tube section has a first end 101a and a second end 101b. The second tube section has a first end 102a and second end 102b. In some aspects, the tube structure is made of a composite material, such as carbon fiber and resin. FIG. 2 illustrates a representational cross-section of the dual tube structure 100 with the first tube section 101 and the second tube section 102. A central panel 103 is coupled to both the first and second tube sections at an upper joining area 180 and at a lower joining area 182 with a composite attachment coupler 105, as discussed further below. The first end 101a and the second end 101b are also coupled to the central panel 103 at an end joining area 181 with the composite attachment coupler 105. The load paths 106 illustrate the tensile stresses in the tube sections and the central panel. Although illustrated as a double bubble structure, more adjacent tubes may be joined in a similar fashion.

A cross plane 107 may be illustrative of the horizontal center line of the structure. In some aspects, the final structure may be assembled from an upper half 108 and a lower half 109 which are formed in molds. In some aspects, resin impregnated carbon fiber sheets for the upper half and the lower half are placed in molds along with the attachment structure portion 105, and cured under vacuum and/or pressure and possibly elevated temperature. The upper half and the lower half may then be attached together as a later assembly step. In such a case, the joining of the upper half and the lower half may involve the joining of only two sheets together as a planar coupling, as opposed to the three-way joint facilitated with the use of the attachment coupler 105. It is understood that the afore-mentioned "planar" coupling may represent a curving plane, as seen with the circular cross-section of the structure.

Figure 3:
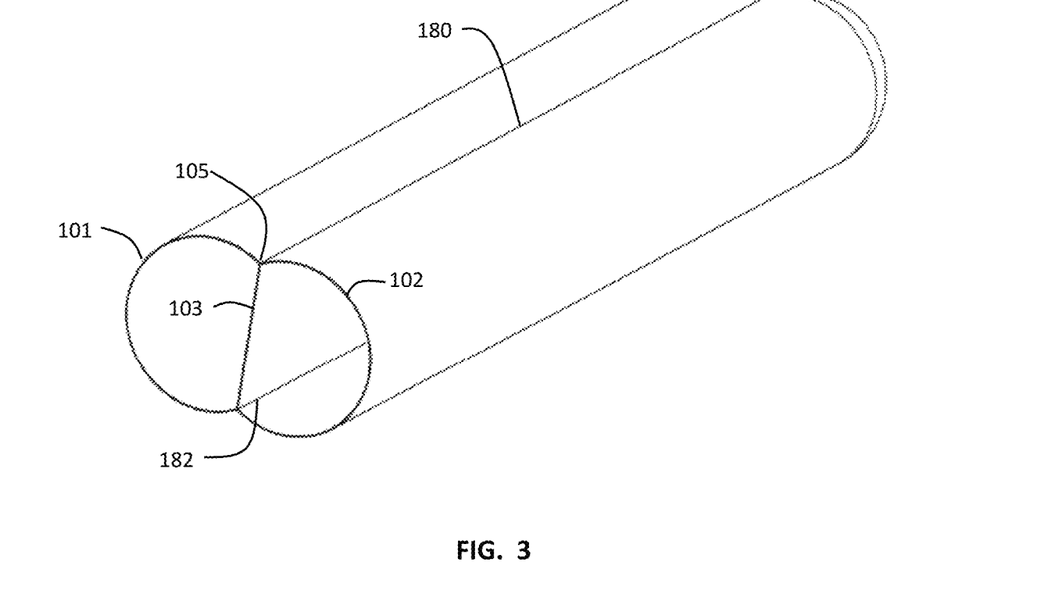
FIG. 3 is a perspective view of a dual tube structure with center panel and panel attachment couplers according to some embodiments of the present invention.

FIG. 3 illustrates the dual tube structure 100 with the first tube section 101 and the second tube section 102 in a perspective view with the first end 101a and the second end 101b removed for clarity of view. A central panel 103 is coupled to both the first and section tube sections at an upper joining area 180 and at a lower joining area 182 with a composite attachment coupler 105, as discussed further below.

Figure 4:
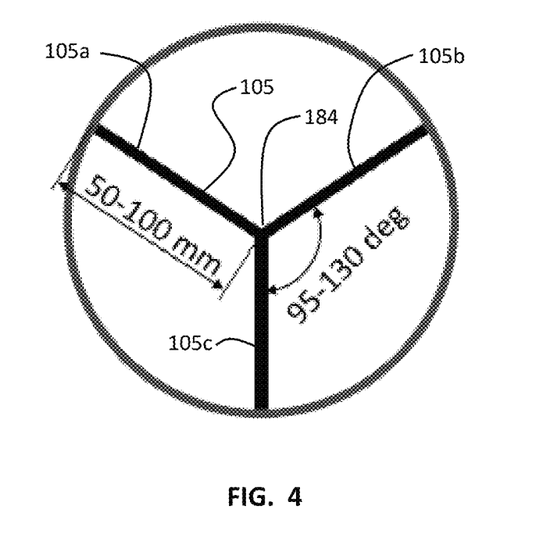
FIG. 4 is a view of an attachment coupler according to some embodiments of the present invention.

FIG. 4 is an illustrative example of an attachment coupler 105 which may be used to couple adjacent tube sections to each other and to the central panel. In this example, the arms 105a, 105b, 105c of the attachment structure portion 105 may be in the range of 50-100 mm, and be spaced in the range of 90-130 degrees. Although referred to as arms 105a, 105b, 105c, the arms may be sheets which may have multiple layers. The longitudinal center 184 of the attachment coupler may define a central axis of the attachment coupler. Longitudinal tows of the arms 105a, 105b, 105c which are closest to the central axis of the attachment structure may be referred to as the central tows of each arm, or sheet. When discussing fibers herein, the fiber "tow" is understood to be a large number of fibers. Typical examples are fiber tows which consist of 3000, 6000, 12000, or 24000 fibers. Tows are generally not twisted, whereas yarns are typically twisted. The warp and weft discussed herein are tows or yarns, and not individual fibers.

Figure 5:
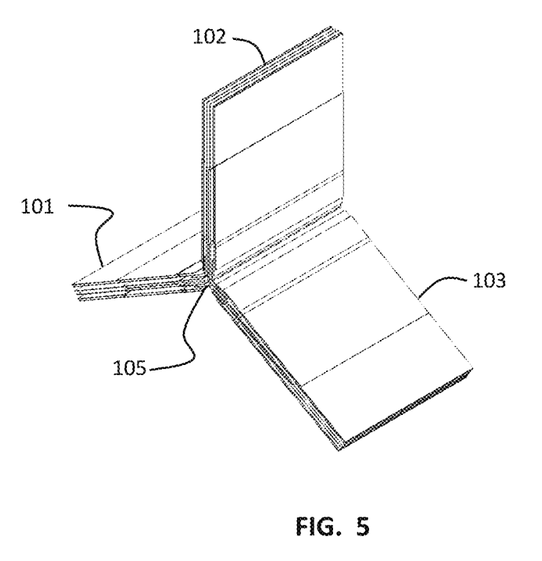
FIG. 5 is a partial view of a tube structure with an attachment coupler according to some embodiments of the present invention.
Figure 6:
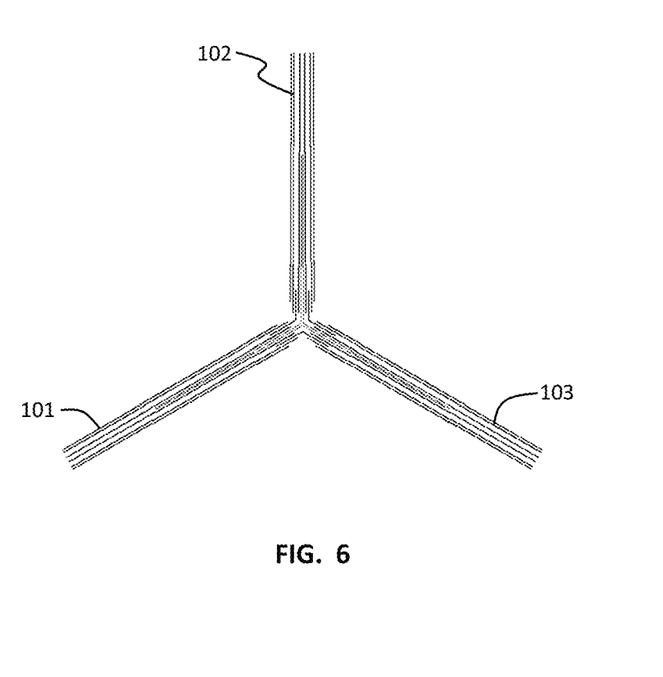
FIG. 6 is a view of the joining area of a dual tube structure according to some embodiments of the present invention.
Figure 7:
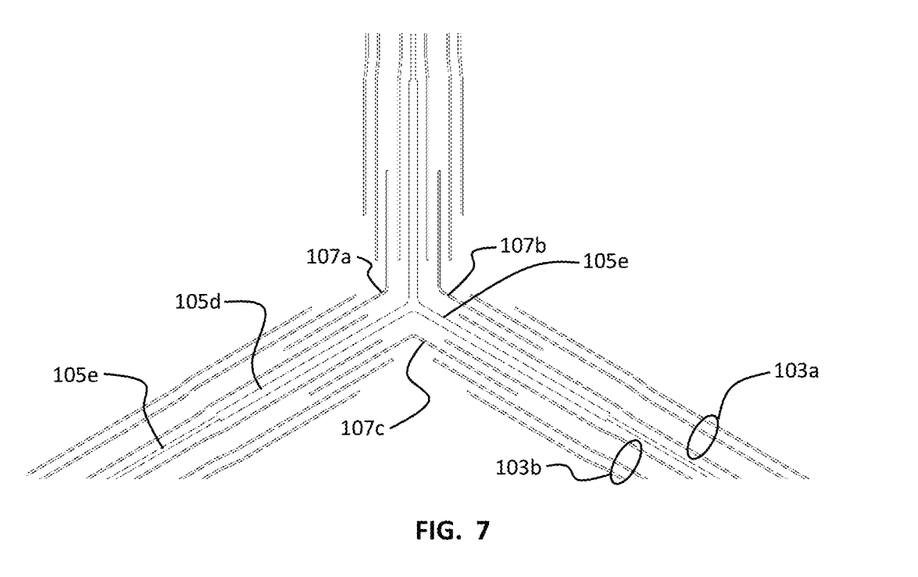
FIG. 7 is a close-up view of the joining area of a dual tube structure according to some embodiments of the present invention.

FIGS. 5-7 illustrate a portion of a double tube structure with an attachment structure portion 105 coupling a first tube section 101, a second tube section 102, and a central portion 103, with just the portion of the tube sections and the central portion closest to the attachment structure illustrated Although illustrated in these views as planar sections, it is to be understood that the tube sections are expected to have curvature. As seen in a slightly exploded view in FIG. 7, the tube sections and the central portion are comprised of a plurality of layers wherein the attachment structure 105 may reside in between the fabric layers of the tube sections. The attachment coupler 105 may be first woven in a manner adapted to increase its strength as a joining structure, as discussed further below, and then be placed in between the layers of the tube sections and central portion as they are laid into the mold. Coupling doublers 107a, 107b, 107c are also laid in to further couple the tube sections and the central portion to each other and to the attachment structure. The attachment structure 105 has a first inner area 105d and second outer area 105e. Using the central portion 103 as an example, the layup of the central portion 103 (as well as the first tube section and the second tube section) has a portion 103a that extends along a first side of the attachment structure 105 and a portion 103b that extends along a second side of the attachment structure 105.

In a manufacturing method to provide a multi-tube structure, preimpregnated fiber sheets may be used when placed into the molds as discussed above. In some aspects, the attachment structures are first manufactured to create an interwoven set of weft and warp tows, and then may be impregnated with appropriate binder or resin prior to use in manufacture. In some aspects, the resin (for example in the form of a resin film) may be added once the adjacent plies are in place.

In an illustrative embodiment, the skins of the tube sections and central portion may have 6 sheet layers, 3 on each side of the arm of the attachment coupler. The orientations of the layers may be 0, 90, and +/−45 degrees on each side. The coupling doublers may have layers of +/−45 degrees and 0 degrees (the latter parallel to the central axis). In some aspects, the fabrics and fibers used in the attachment structure and the tube sections is carbon fiber, and the completed assemblies would include cured resin or other appropriate material to provide a composite material. In some aspects, other fiber types may be used.

Figure 8:
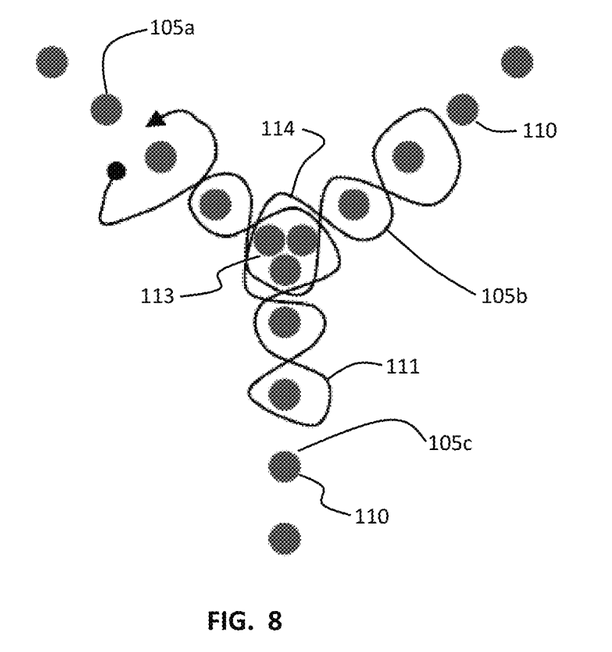
FIG. 8 is an illustration of the central weft tows according to some embodiments of the present invention.
Figure 9:
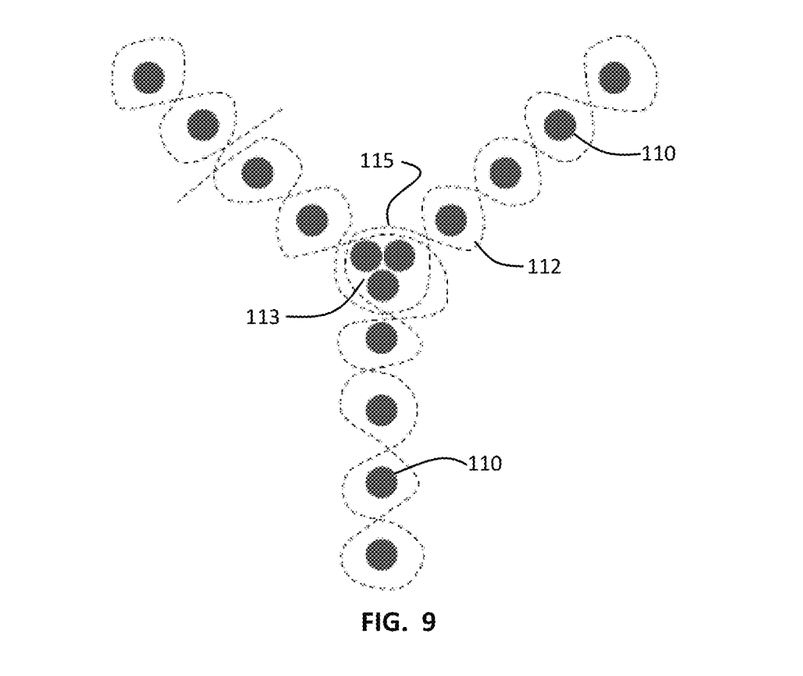
FIG. 9 is an illustration of the extended weft tows according to some embodiments of the present invention.

FIGS. 8 and 9 separately illustrate the weave of an inner area and an outer area of an attachment structure 105. Although illustrated in FIGS. 8 and 9 with only 5 warp (longitudinal) tows per arm of the attachment structure, it is to be understood that there may be many more such warp tows. In some aspects, there may be layers of tows in each of the arms 105a, 105b, 105c. In an illustrative embodiment, each arm of the attachment structure extend for 75 mm, with the inner area extending for 25 mm, and the outer area extending for the full 75 mm. The spacing to the warp tows may be on the order of 2-3 mm, such that the inner area comprises approx. 8 tows, and the overall arm comprises approx. 25 tows. The fabric of the attachment structure has warp tows 110 which are cross woven with weft tows 114 in the inner portion to an extension point tow 111, as illustrated in FIG. 8. The central inner tows of each of the three arms may be bound around with the weft tows into a central cluster 113. Also, the outer area of the attachment structure has weft tows 112 which are crossed into the warp tows 110 all the way out to the ends of the arms of the attachment structure, as illustrated in FIG. 9. These weft tows 112 may also be wound 115 around the central inner tows of the arms to further strengthen the central cluster 113. Although the weft tows are illustrated as thinner lines in the Figures, it is to be understood that the warp and weft tows may be of similar size and strength, which may be a 3 k, 6 k or 12 k tow, for example. Although two different weft tows 114, 112 are illustrated in the two FIGS. 8 and 9, this has been done for clarity and the two different weft tows 114, 112 may both be present in a single embodiment.

The cross weaving of the weft tows may be seen along the entire longitudinal length of the attachment structure, and then similarly this would be along the entire longitudinal length of the tube structure. It is expected that the use of the cross woven attachment structure, including with a bound central cluster, will provide a joint with between 2 and 10 times the strength of that seen in previous approaches. This increased strength then also provides the benefit of reduced weight, which is of high importance in aircraft, for example.

Figure 10:
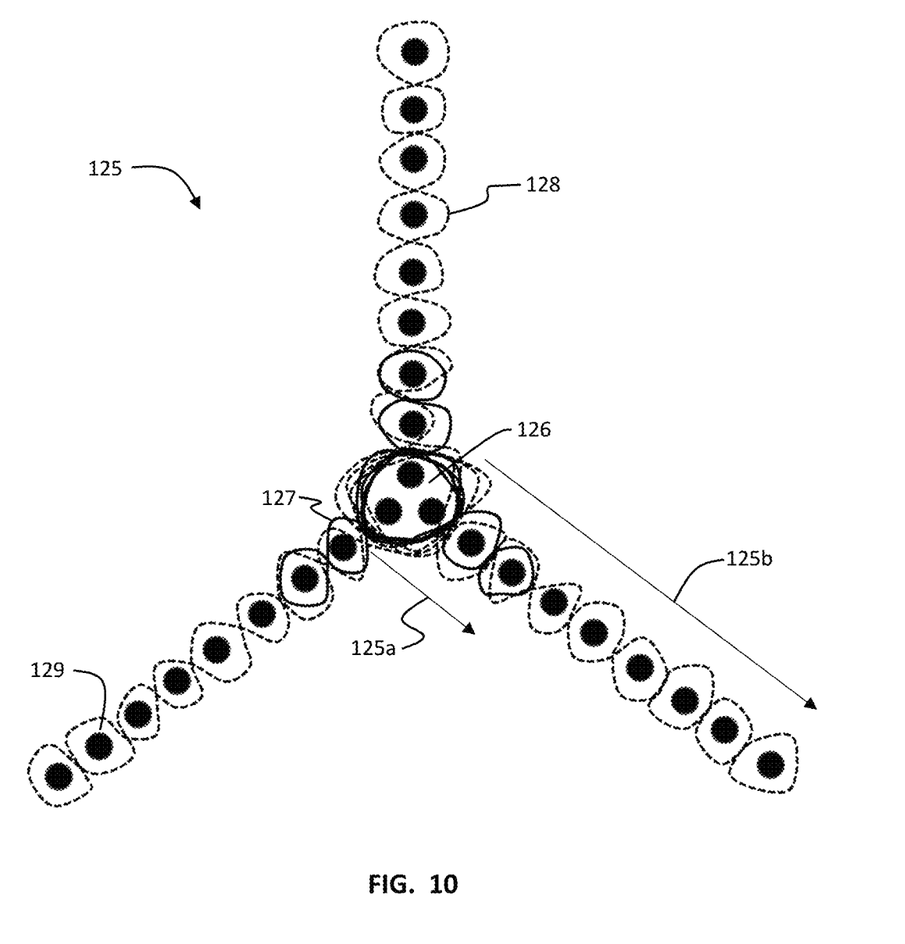
FIG. 10 is a cross-section of a joining coupler with central and extended weft tows according to some embodiments of the present invention.

FIG. 10 provides an illustrative example of an attachment structure 125 according to some embodiments of the present invention. Each of the three arms of the Y shaped attachment structure has an inner area 125a and a full length 125b. The warp tows 129 are interwoven with weft tows 128 which cross weave through the warp tows 129 throughout the entire length 125b, as well as encasing the central cluster 126. Also, the warp tows 129 are interwoven with the weft tows 127 within the inner area 125a, as well as encasing the central cluster 126.

Figure 11:
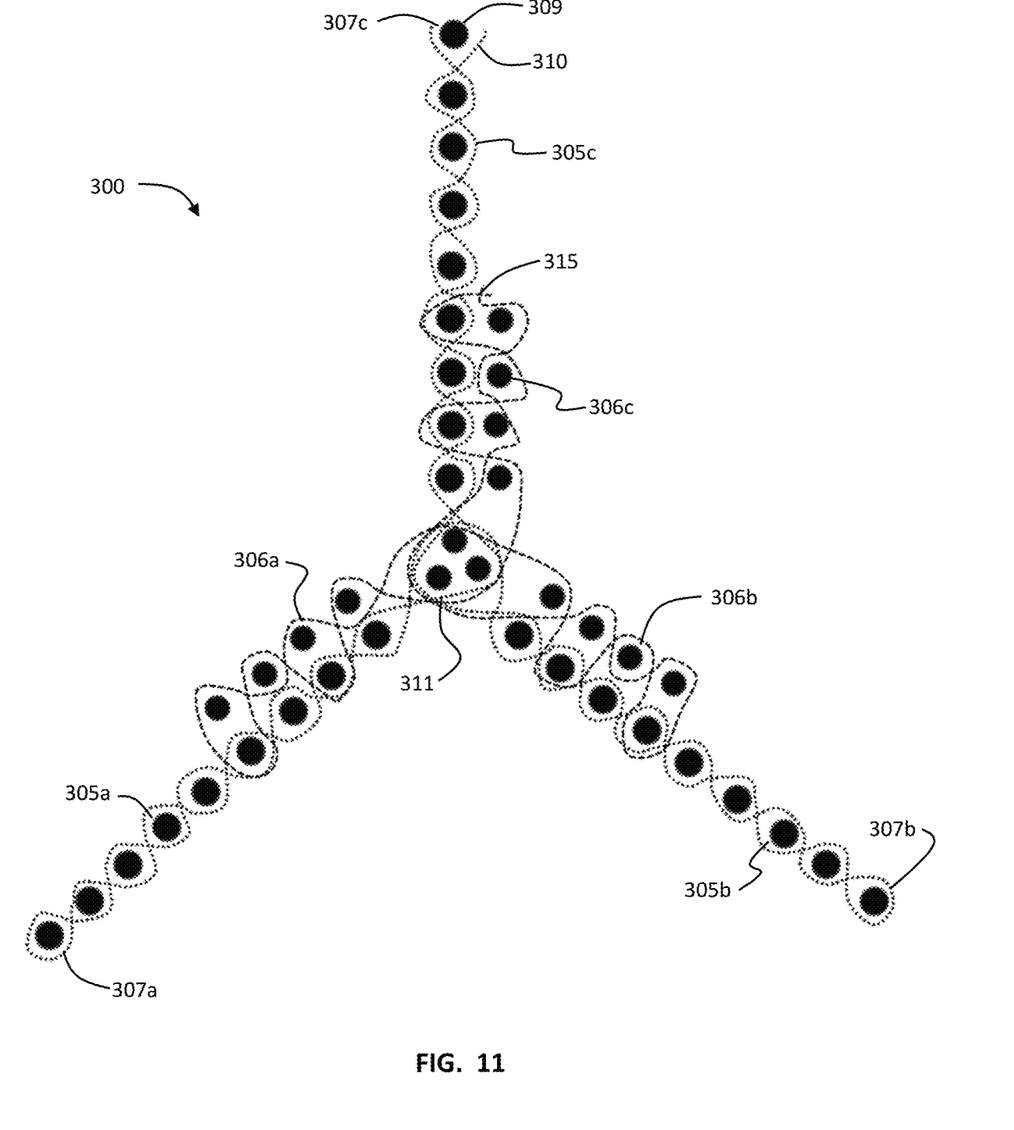
FIG. 11 is a cross-section of a joining coupler with an additional layer according to some embodiments of the present invention.

FIG. 11 provides an illustrative example of an attachment structure 300 according to some embodiments of the present invention. Each of the three arms 305a, 305b, 305c of the Y shaped attachment structure 300 has an inner area 306a, 306b, 306c with one or more additional tow layers, as well as full length layers 307a, 307b, 307c. A first warp tow 310 may wrap around the weft tows 309 of the full length layers 307a, 307b, 307c. The central tows 311 of the arms 305a, 305b, 305c are illustrated in expanded fashion to allow for clearer view of the tows wrapping, but are understood to be the central tows of the arms. A second warp tows 315 may wrap around the weft tows of both the inner portions of the full length layers 307a, 307b, 307c and the inner layers of the inner areas 306a, 306b, 306c. The second warp tow 315 may wrap around the central tows 311 in some aspects.

Figure 12:
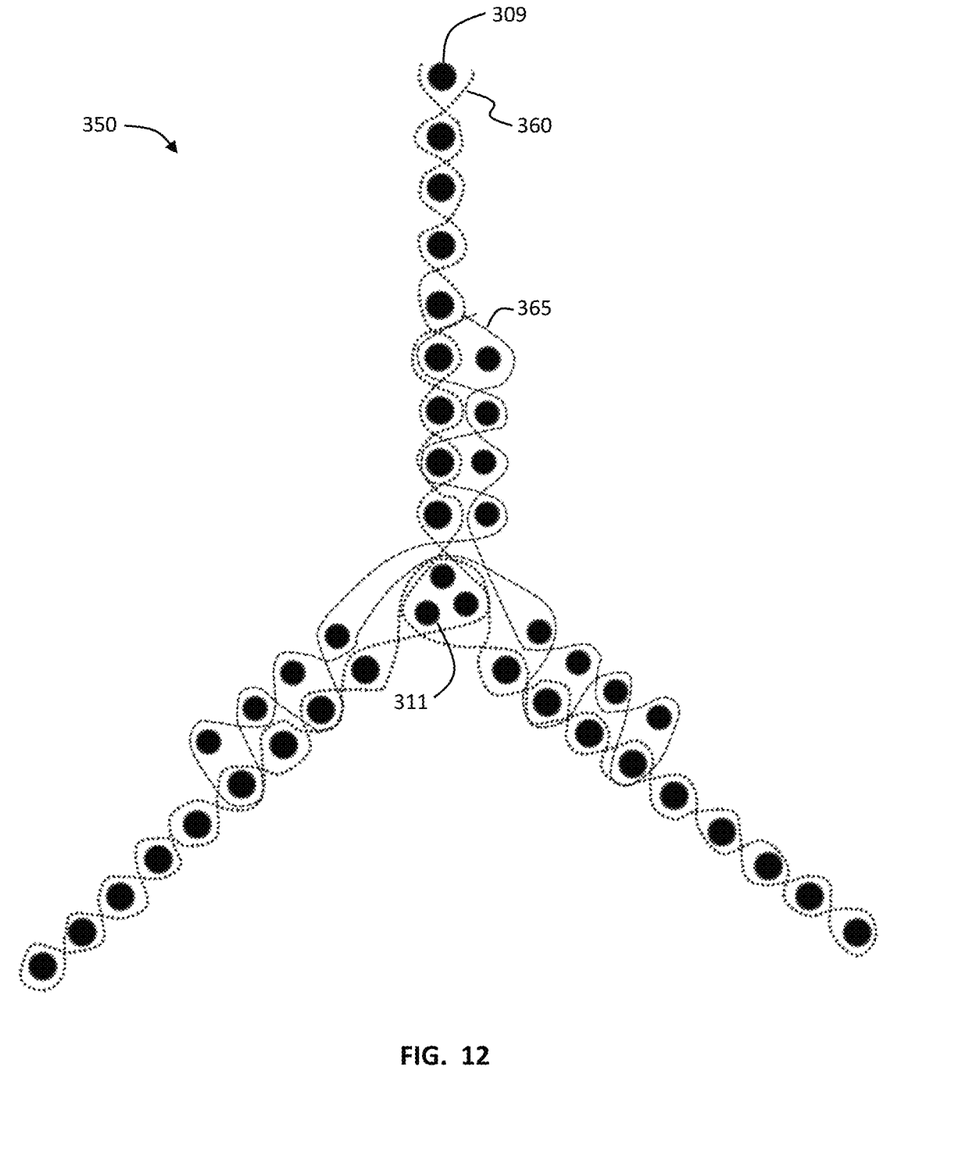
FIG. 12 is a cross-section of a joining coupler with an additional layer according to some embodiments of the present invention.

FIG. 12 provides another example of an attachment structure 350 according to some embodiments of the present invention. In this illustrative embodiment, the first weft tow 360 wraps around the warp tows of the full length layers as well as encircling the central tows 311 of the three arms. The second weft tow 365 wraps around the warp tows of the inner portions of the full length layer of the three arms and the warp tows of the inner area layers, but the second weft tow does not encircle the central tows 311.

Figure 13:
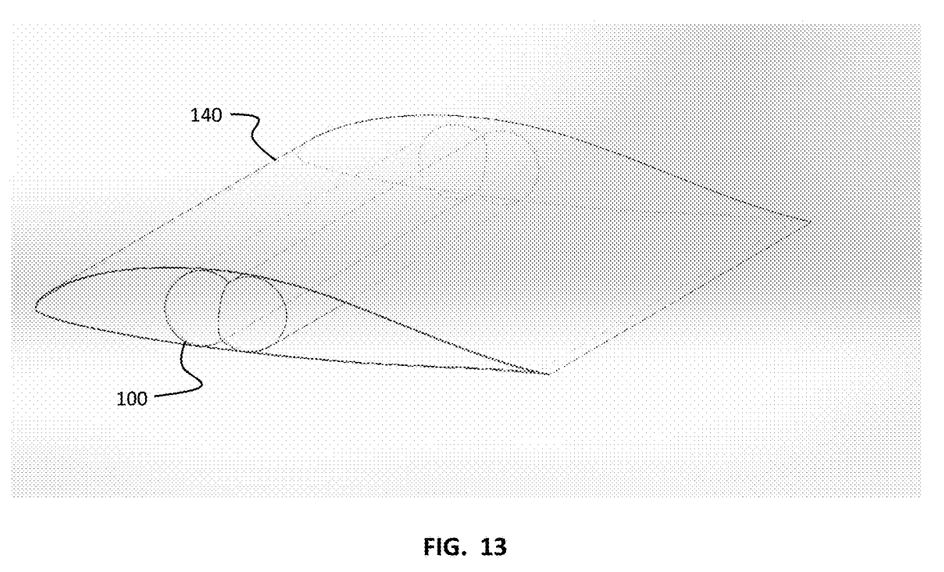
FIG. 13 is an oblique view of an airfoil with a dual tube structure within according to some embodiments of the present invention.
Figure 14:
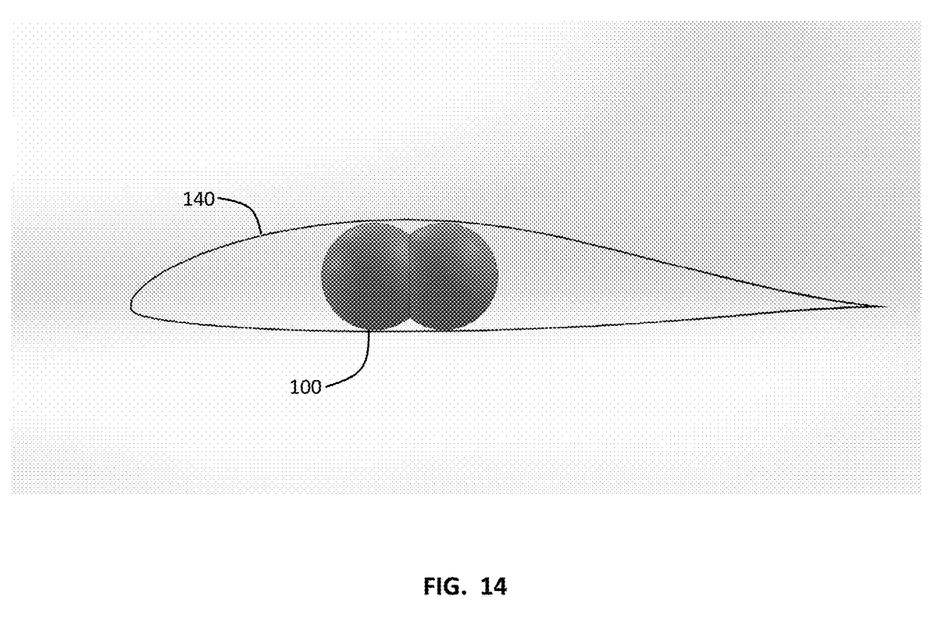
FIG. 14 is a side view of an airfoil with a dual tube structure within according to some embodiments of the present invention.

In some embodiments of the present invention, as seen in FIGS. 13 and 14, a wing 140 has a dual tube structure 100 within it. In some aspects, the dual tube structure within the wing may be configured to store fuel for an aircraft in one or more of the tube sections.

Figure 15:
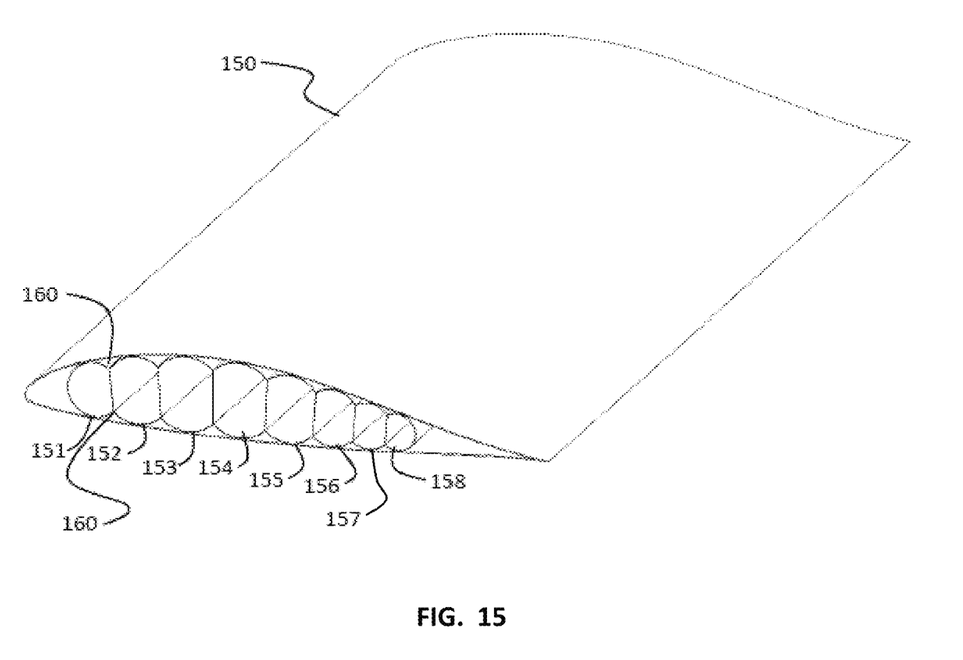
FIG. 15 is an oblique view of an airfoil with a multi-tube structure within according to some embodiments of the present invention.

FIG. 15 illustrates a wing 150 with a plurality of tube sections 151, 152, 153, 154, 155, 156, 157, 158 which are joined with attachment structures 160. In some aspects, the plurality of tube sections may be configured to store fuel in one or more of the tube sections.

Figure 16:
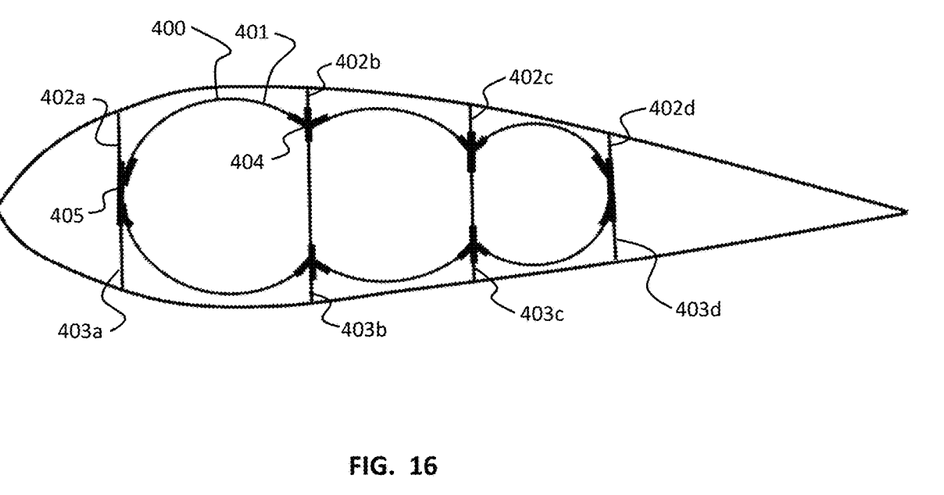
FIG. 16 is a cross-sectional view of a wing with a multi-tube structure with vertical extensions according to some embodiments of the present invention.

FIG. 16 illustrates a side view of a multi-tube structure 400 within a wing 401 with vertical extensions 402a, 402b, 402c, 402d, 403a, 403b, 403c, 403d according to some embodiments of the present invention. A four-way coupler 404 may be used to couple adjacent tube segments, the center segment, and the vertical extension. At a front or rear end of the multi-tube structure, another four-way coupler 405 may be used to couple upper and lower tube segments to the upper and lower vertical extensions 402a, 403a, 402d, 403d.

Figure 17:
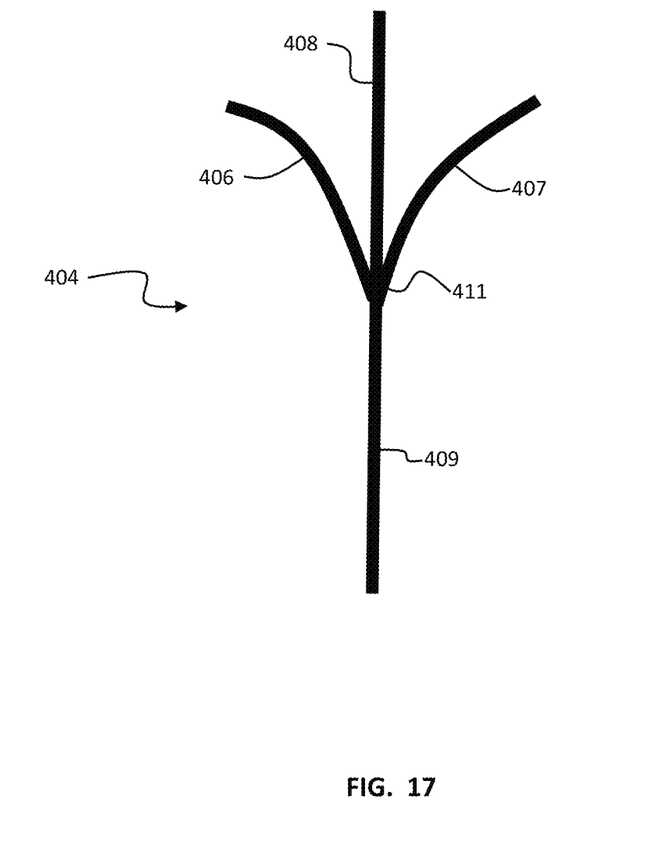
FIG. 17 is a four way attachment structure according to some embodiments of the present invention.

FIG. 17 illustrates a cross-sectional view of a four bladed coupler 404 according to some embodiments of the present invention. This four-way coupler may be used to couple adjacent tube segments, the center segment, and the vertical extension, in some aspects. Tube segment arms 406, 407 may be coupled to adjacent tube upper or lower segments. A lower arm 409 may be coupled to a center section of a tube structure. The upper arm 408 may be coupled to a vertical extension of the tube structure. The center axis 411 runs longitudinally down the coupler. In some aspects, the four bladed coupler 404 utilizes weft tows to intertwine the warp tows in a similar fashion to other embodiments discussed above.

Figure 18:
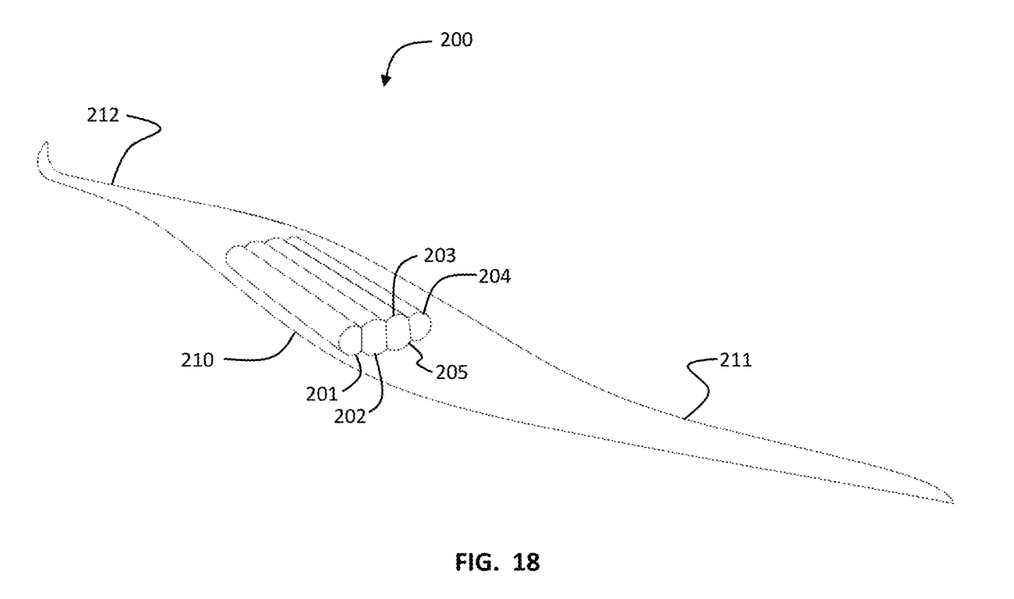
FIG. 18 is a view of an asymmetric wing aircraft with a multi-tube structure within according to some embodiments of the present invention.

In some aspects of the present invention, as seen in FIG. 18, an asymmetric oblique wing aircraft 200 has a plurality of tube sections 201, 202, 203, 204 joined with attachment structures 205. In some aspects, the asymmetric oblique wing aircraft 200 may have a center section 210 and outside sections 211, 212. In some aspects, the center section 210 may be substantially thicker than the outside sections 211, 212. The plurality of tube sections 201, 202, 203, 204 may be configured to house passengers, fuel, cargo, and other items.

Although illustrated with tube structures in certain orientations, the tube structures may be oriented chordwise, spanwise, streamwise, or in other orientations.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An attachment coupler for a dual multi-tube structure, said attachment coupler comprising:
    a first sheet, said first sheet comprising a first layer of warp tows running longitudinally along said first sheet;
    a second sheet, said second sheet comprising a first layer of warp tows running longitudinally along said second sheet;
    a third sheet, said third sheet comprising a first layer of warp tows running longitudinally along said third sheet;
    wherein said first sheet, said second sheet, and said third sheet are coupled together along a central axis and woven with weft tows crossing through said warp tows.

2. The attachment coupler of claim 1 wherein said first, second, and third sheets have central tows closest to said central axis, and wherein said weft tows are wound around the central tows of said first, said second, and said third sheets together.

3. The attachment coupler of claim 2 wherein said first sheet further comprises a second layer of warp tows overlaying said first layer of warp tows, wherein said first layer of warp tows of said first sheet extends further from said central axis than said second layer, and wherein said second sheet further comprises a second layer of warp tows overlaying said first layer of warp tows, wherein said first layer of warp tows of said second sheet extends further from said central axis than said second layer, and wherein said third sheet further comprises a second layer of warp tows overlaying said first layer of warp tows, wherein said first layer of warp tows of said third sheet extends further from said central axis than said second layer.

4. The attachment coupler of claim 1 wherein said weft tows comprise a first plurality of weft tows and a second plurality of weft tows, wherein said first plurality of weft tows are woven crossing through all of the warp tows of said first, said second, and said third sheets, and wherein said second plurality of weft tows are woven crossing through a subset of the warp tows of said first, said second, and said third sheets closest to said central axis.

5. The attachment coupler of claim 4 wherein said first sheet further comprises a second layer of warp tows overlaying said first layer of warp tows, wherein said first layer of warp tows of said first sheet extends further from said central axis than said second layer, and wherein said second sheet further comprises a second layer of warp tows overlaying said first layer of warp tows, wherein said first layer of warp tows of said second sheet extends further from said central axis than said second layer, and wherein said third sheet further comprises a second layer of warp tows overlaying said first layer of warp tows, wherein said first layer of warp tows of said third sheet extends further from said central axis than said second layer.

6. The attachment coupler of claim 1 wherein said first sheet further comprises a second layer of warp tows overlaying said first layer of warp tows, wherein said first layer of warp tows of said first sheet extends further from said central axis than said second layer, and wherein said second sheet further comprises a second layer of warp tows overlaying said first layer of warp tows, wherein said first layer of warp tows of said second sheet extends further from said central axis than said second layer, and wherein said third sheet further comprises a second layer of warp tows overlaying said first layer of warp tows, wherein said first layer of warp tows of said third sheet extends further from said central axis than said second layer.

7. An attachment coupler for a dual multi-tube structure, said attachment coupler comprising:
- a first sheet, said first sheet comprising warp tows running longitudinally along said first sheet;
- a second sheet, said second sheet comprising warp tows running longitudinally along said second sheet;
- a third sheet, said third sheet comprising warp tows running longitudinally along said third sheet;
- a fourth sheet, said fourth sheet comprising warp tows running longitudinally along said fourth sheet;

wherein said first sheet, said second sheet, said third sheet, and said fourth sheet are coupled together along a central axis and woven with weft tows crossing through said warp tows.

8. The attachment coupler of claim 7 wherein said first, second, third, and fourth sheets have central tows closest to said central axis, and wherein said weft tows are wound around the central tows of said first, said second, said third, and said fourth sheets together.

9. The attachment coupler of claim 7 wherein said weft tows comprise a first plurality of weft tows and a second plurality of weft tows, wherein said first plurality of weft tows are woven crossing through all of the warp tows of said first, said second, and said third sheets, and wherein said second plurality of weft tows are woven crossing through a subset of the warp tows of said first, said second, and said third sheets closest to said central axis.

\* \* \* \* \*